United States Patent
Harish et al.

(10) Patent No.: US 12,169,819 B2
(45) Date of Patent: Dec. 17, 2024

(54) METHOD AND SYSTEM FOR ROUTING PAYMENT TRANSACTIONS OF A PAYMENT ACCOUNT

(71) Applicant: Visa International Service Association, San Francisco, CA (US)

(72) Inventors: Venkatesan Harish, Singapore (SG); Dinesh Vadivel, Singapore (SG)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 18/500,412

(22) Filed: Nov. 2, 2023

(65) Prior Publication Data
US 2024/0062181 A1 Feb. 22, 2024

Related U.S. Application Data

(63) Continuation of application No. 16/986,728, filed on Aug. 6, 2020, now Pat. No. 11,842,330.

(51) Int. Cl.
*G06Q 20/20* (2012.01)
*G06Q 20/02* (2012.01)
*G06Q 20/08* (2012.01)

(52) U.S. Cl.
CPC ......... *G06Q 20/204* (2013.01); *G06Q 20/027* (2013.01); *G06Q 20/0855* (2013.01)

(58) Field of Classification Search
CPC ............... G06Q 20/204; G06Q 20/027; G06Q 20/0855; G06Q 20/20; G06Q 20/102
See application file for complete search history.

(56) References Cited

U.S. PATENT DOCUMENTS

| | | | |
|---|---|---|---|
| 11,354,651 B2* | 6/2022 | Ortiz | G06Q 20/023 |
| 2012/0179558 A1* | 7/2012 | Fischer | G06Q 20/20 705/16 |
| 2016/0148182 A1* | 5/2016 | Craine | G06Q 20/3278 705/16 |
| 2016/0321663 A1* | 11/2016 | Batlle | G06Q 20/405 |
| 2017/0300883 A1* | 10/2017 | Bethke, II | G06Q 30/0239 |
| 2017/0300918 A1* | 10/2017 | Bernstein | G06Q 20/4016 |
| 2019/0188578 A1* | 6/2019 | Manoharan | G06Q 20/4016 |
| 2020/0258078 A1* | 8/2020 | Bagul | G06Q 20/227 |

(Continued)

*Primary Examiner* — Michael Jared Walker
(74) *Attorney, Agent, or Firm* — The Webb Law Firm

(57) ABSTRACT

Disclosed herein is a method and system for routing payment transactions of a payment account. After the payment transaction is initiated, a payment server identifies flag information from the payment request indicating a payment account to be multi-configurable. When the payment server identifies that the payment request is from the POS device, the payment server retrieves primary configuration details corresponding to the payment account from a routing service and routes the payment transaction for the payment request to an issuer corresponding to the primary configuration details. Further, when the payment server identifies that the payment request is from a payment gateway, the payment server retrieves a list of names of configuration details corresponding to the payment account from the routing service for selection. Upon selection, the payment server retrieves configuration details corresponding to the selected issuer and routes the payment transaction to the issuer for completing the payment transaction.

20 Claims, 8 Drawing Sheets

(56) References Cited

U.S. PATENT DOCUMENTS

2020/0394655 A1\* 12/2020 Singh .................. G06Q 20/10
2021/0027275 A1\* 1/2021 Mooppanar .......... G06Q 20/357
2021/0027285 A1\* 1/2021 Jalil ................ G06Q 20/38215

\* cited by examiner

METHOD AND SYSTEM FOR ROUTING PAYMENT TRANSACTIONS OF A PAYMENT ACCOUNT

CROSS REFERENCE TO RELATED APPLICATION

This application is a continuation application of U.S. patent application Ser. No. 16/986,728, filed Aug. 6, 2020, the disclosure of which is hereby incorporated by reference in its entirety.

BACKGROUND

1. Technical Field

The present subject matter is generally related to payment transactions and more particularly, but not exclusively, to a method and a system for routing payment transactions of a payment account.

2. Technical Considerations

At present, many users/customers use payment cards, such as credit cards and debit cards, as they come along with various rewards, such as cash-back, gift vouchers, redemptions, and the like. However, each payment card is unique and will have a specific configuration and benefits attributed to it which cannot be found on other payment cards.

As an example, the credit card associated with a first issuer may provide cash-back rewards and the credit card associated with a second issuer may provide a gift voucher. If a user wishes to avail themselves with these benefits, then the user may need to carry two different credit cards. Technically, a credit card from the first issuer is not capable to avail the benefits of the second issuer. Hence, it may be difficult for the customers to hold multiple cards to gain the benefits from multiple issuers.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method comprising: receiving, by a payment server, a payment request associated with a payment account, wherein the payment request comprises details of the payment account; identifying, by the payment server, flag information from the payment request indicating the payment account to be multi-configurable, when the payment request is from a payment gateway and the payment account is multi-configurable; retrieving, by the payment server, a list of names of configuration details corresponding to the payment account from a routing service associated with the payment server; identifying, by the payment server, if there is a pre-set name of configuration detail as a primary configuration for the payment account; providing, by the payment server, the list of names to a user associated with the payment account and the pre-set name for selection; performing one of: retrieving, by the payment server, configuration details, corresponding to the payment account from the routing service, which is selected as primary configuration details when the payment account is multi-configurable; or retrieving, by the payment server, configuration details corresponding to a selected name from the list of names or the pre-set name from the routing service; and routing, by the payment server, a payment transaction for the payment request to an issuer corresponding to the configuration details for completing the payment transaction.

In some non-limiting embodiments or aspects, the primary configuration details are selected when the payment request is from a Point of Sale (POS) device. In some non-limiting embodiments or aspects, the primary configuration details are selected from a list of names of configuration details provided to the POS device upon identifying the flag information from the payment request indicating the payment account to be multi-configurable. In some non-limiting embodiments or aspects, the payment request is received from the payment gateway when details of the payment account are provided at a merchant application, wherein the merchant application is associated with the payment gateway. In some non-limiting embodiments or aspects, the list of names of configuration details is provided on the merchant application for selection by the user when the payment request is received from the payment gateway. In some non-limiting embodiments or aspects, the configuration details corresponding to the selected name are stored as the primary configuration details at the merchant application for future transactions.

In some non-limiting embodiments or aspects, provided is a computer-implemented method comprising: registering, by a payment server, a payment account which is multi-configurable with the payment server for a third-party credit provider configuration; receiving, by the payment server, a payment request associated with the payment account from a payment gateway when details of the payment account are provided at a first merchant application; providing, by the payment server, a list of names of configuration details corresponding to the payment account to a user associated with the payment account along with a pay-later option associated with the first merchant application; retrieving, by the payment server, configuration details corresponding to a selected pay-later option from a routing service of the payment server; identifying, by the payment server, the first merchant application as a credit provider for a payment transaction; sending, by the payment server, a request to a first merchant application to complete a payment transaction for the payment request using a credit amount provided by the first merchant application when the first merchant application is identified as a third-party credit provider for the payment request: to create a transaction ledger for every payment transaction of the user with the first merchant application; and to deduct the credit amount from an issuer associated with the payment account.

In some non-limiting embodiments or aspects, the method further comprises: sending, by the payment server, a request to a second merchant application to complete a payment transaction for the payment request using a credit amount provided by a second merchant application when the second merchant application is identified as a third-party credit provider for the payment request: to create a transaction ledger for every payment transaction of the user with the second merchant application; and to deduct the credit amount from an issuer associated with the payment account. In some non-limiting embodiments or aspects, the payment account which is multi-configurable is registered with the payment server through one of a merchant application or an issuer application associated with one or more issuers. In some non-limiting embodiments or aspects, one or more merchants are registered with the payment server for a third-party credit provider configuration.

In some non-limiting embodiments or aspects, provided is a payment server, comprising: one or more processors; and one or more computer-readable media, communicatively coupled to the one or more processors storing instructions, which upon execution, causes the one or more processors to: receive a payment request associated with a payment account, wherein the payment request comprises details of the payment account; identify flag information from the payment request indicating the payment account to be multi-configurable, when the payment request is from a payment gateway and the payment account is multi-configurable; retrieve a list of names of configuration details corresponding to the payment account from a routing service associated with the payment server; identify if there is a pre-set name of configuration details as a primary configuration for the payment account; provide the list of names to a user associated with the payment account and the pre-set name for selection; performing one of: retrieving configuration details, corresponding to the payment account from the routing service, which is selected as primary configuration details when the payment account is multi-configurable; or retrieving configuration details corresponding to a selected name from the list of names or the pre-set name from the routing service; and route a payment transaction for the payment request to an issuer corresponding to the configuration details for completing the payment transaction.

In some non-limiting embodiments or aspects, the one or more processors select the primary configuration details when the payment request is from a Point of Sale (POS) device. In some non-limiting embodiments or aspects, the one or more processors select the primary configuration details from a list of names of configuration details provided to the POS device upon identifying the flag information from the payment request indicating the payment account to be multi-configurable. In some non-limiting embodiments or aspects, the one or more processors receive the payment request from the payment gateway when details of the payment account are provided at a merchant application, and wherein the merchant application is associated with the payment gateway. In some non-limiting embodiments or aspects, the one or more processors provide the list of names of configuration details on the merchant application for selection by the user when the payment request is received from the payment gateway. In some non-limiting embodiments or aspects, the one or more processors store the configuration details corresponding to the selected name as the primary configuration details at the merchant application for future transactions.

In some non-limiting embodiments or aspects, provided is a payment server comprising: one or more processors; and one or more computer-readable media, communicatively coupled to the one or more processors storing instructions, which upon execution, cause the one or more processors to: register a payment account which is multi-configurable with the payment server for third-party credit provider configuration; receive a payment request associated with the payment account from a payment gateway when details of the payment account are provided at a first merchant application; provide a list of names of configuration details corresponding to the payment account to a user associated with the payment account along with a pay-later option associated with the first merchant application; retrieve configuration details corresponding to a selected pay-later option from a routing service of the payment server; identify the first merchant application as a credit provider for a payment transaction; send a request to a first merchant application to complete the payment transaction for the payment request using a credit amount provided by the first merchant application when the first merchant application is identified as a third-party credit provider for the payment request: to create a transaction ledger for every payment transaction of the user with the first merchant application; and to deduct the credit amount from an issuer associated with the payment account.

In some non-limiting embodiments or aspects, the one or more processors send a request to a second merchant application to complete the payment transaction for the payment request using a credit amount provided by a second merchant application when the second merchant application is identified as a third-party credit provider for the payment request: to create a transaction ledger for every payment transaction of the user with the second merchant application; and to deduct the credit amount from an issuer associated with the payment account. In some non-limiting embodiments or aspects, the one or more processors register the payment account which is multi-configurable with the payment server through one of a merchant application or an issuer application associated with one or more issuers. In some non-limiting embodiments or aspects, the one or more processors register one or more merchants with the payment server for a third-party credit provider configuration.

Further non-limiting embodiments or aspects are set forth in the following numbered clauses:

Clause 1: A computer-implemented method comprising: receiving, by a payment server, a payment request associated with a payment account, wherein the payment request comprises details of the payment account; identifying, by the payment server, flag information from the payment request indicating the payment account to be multi-configurable, when the payment request is from a payment gateway and the payment account is multi-configurable; retrieving, by the payment server, a list of names of configuration details corresponding to the payment account from a routing service associated with the payment server; identifying, by the payment server, if there is a pre-set name of configuration details as a primary configuration for the payment account; providing, by the payment server, the list of names to a user associated with the payment account and the pre-set name for selection; performing one of: retrieving, by the payment server, configuration details, corresponding to the payment account from the routing service, which is selected as primary configuration details when the payment account is multi-configurable; or retrieving, by the payment server, configuration details corresponding to a selected name from the list of names or the pre-set name from the routing service; and routing, by the payment server, a payment transaction for the payment request to an issuer corresponding to the configuration details for completing the payment transaction.

Clause 2: The method of clause 1, wherein the primary configuration details are selected when the payment request is from a Point of Sale (POS) device.

Clause 3: The method of clause 1 or 2, wherein the primary configuration details are selected from a list of names of configuration details provided to the POS device upon identifying the flag information from the payment request indicating the payment account to be multi-configurable.

Clause 4: The method of any of clauses 1-3, wherein the payment request is received from the payment gateway when details of the payment account are provided at a merchant application, wherein the merchant application is associated with the payment gateway.

Clause 5: The method of any of clauses 1-4, wherein the list of names of configuration details is provided on the merchant application for selection by the user when the payment request is received from the payment gateway.

Clause 6: The method of any of clauses 1-5, wherein the configuration details corresponding to the selected name is stored as the primary configuration details at the merchant application for future transactions.

Clause 7: A computer-implemented method comprising: registering, by a payment server, a payment account which is multi-configurable with the payment server for a third-party credit provider configuration; receiving, by the payment server, a payment request associated with the payment account from a payment gateway when details of the payment account are provided at a first merchant application; providing, by the payment server, a list of names of configuration details corresponding to the payment account to a user associated with the payment account 101 along with a pay-later option associated with the first merchant application; retrieving, by the payment server, configuration details corresponding to a selected pay-later option from a routing service of the payment server; identifying, by the payment server, the first merchant application as a credit provider for a payment transaction; sending, by the payment server, a request to the first merchant application to complete a payment transaction for the payment request using a credit amount provided by the first merchant application when the first merchant application is identified as a third-party credit provider for the payment request: to create a transaction ledger for every payment transaction of the user with the first merchant application; and to deduct the credit amount from an issuer associated with the payment account.

Clause 8: The method of clause 7, further comprising: sending, by the payment server, a request to a second merchant application to complete a payment transaction for the payment request using a credit amount provided by the second merchant application when the second merchant application is identified as a third-party credit provider for the payment request: to create a transaction ledger for every payment transaction of the user with the second merchant application; and to deduct the credit amount from the issuer associated with the payment account.

Clause 9: The method of clause 7 or 8, wherein the payment account which is multi-configurable is registered with the payment server through one of a merchant application or an issuer application associated with one or more issuers.

Clause 10: The method of any of clauses 7-9, wherein one or more merchants are registered with the payment server for a third-party credit provider configuration.

Clause 11: A payment server, comprising: one or more processors; and one or more computer-readable media, communicatively coupled to the one or more processors storing instructions, which upon execution, causes the one or more processors to: receive a payment request associated with a payment account wherein the payment request comprises details of the payment account; identify flag information from the payment request indicating the payment account to be multi-configurable, when the payment request is from a payment gateway and the payment account is multi-configurable; retrieve a list of names of configuration details corresponding to the payment account from a routing service associated with the payment server; identify if there is a pre-set name of configuration details as a primary configuration for the payment account; provide the list of names to a user associated with the payment account and the pre-set name for selection; performing one of: retrieving configuration details, corresponding to the payment account from the routing service, which is selected as primary configuration details when the payment account is multi-configurable; or retrieving configuration details corresponding to a selected name from the list of names or the pre-set name from the routing service; and route a payment transaction for the payment request to an issuer corresponding to the configuration details for completing the payment transaction.

Clause 12: The payment server of clause 11, wherein the one or more processors select the primary configuration details when the payment request is from a Point of Sale (POS) device.

Clause 13: The payment server of clause 11 or 12, wherein the one or more processors select the primary configuration details from a list of names of configuration details provided to the POS device upon identifying the flag information from the payment request indicating the payment account to be multi-configurable.

Clause 14: The payment server of any of clauses 11-13, wherein the one or more processors receive the payment request from the payment gateway when details of the payment account are provided at a merchant application, and wherein the merchant application is associated with the payment gateway.

Clause 15: The payment server of any of clauses 11-14, wherein the one or more processors provide the list of names of configuration details on the merchant application for selection by the user when the payment request is received from the payment gateway.

Clause 16: The payment server of any of clauses 11-15, wherein the one or more processors store the configuration details corresponding to the selected name as the primary configuration details at the merchant application for future transactions.

Clause 17: A payment server comprising: one or more processors; and one or more computer-readable media, communicatively coupled to the one or more processors storing instructions, which upon execution, cause the one or more processors to: register a payment account which is multi-configurable with the payment server for third-party credit provider configuration; receive a payment request associated with the payment account from a payment gateway when details of the payment account are provided at a first merchant application; provide a list of names of configuration details corresponding to the payment account to a user associated with the payment account along with a pay-later option associated with the first merchant application; retrieve configuration details corresponding to a selected pay-later option from a routing service of the payment server; identify the first merchant application as a credit provider for a payment transaction; send a request to the first merchant application to complete the payment transaction for the payment request using a credit amount provided by the first merchant application when the first merchant application is identified as a third-party credit provider for the payment request: to create a transaction ledger for every payment transaction of the user with the first merchant application; and to deduct the credit amount from an issuer associated with the payment account.

Clause 18: The payment server of clause 17, wherein the one or more processors send a request to a second merchant application to complete a payment transaction for the payment request using a credit amount provided by the second merchant application when the second merchant application is identified as a third-party credit provider for the payment request: to create a transaction ledger for every payment transaction of the user with the second merchant application; and to deduct the credit amount from an issuer associated with the payment account.

Clause 19: The payment server of clause 17 or 18, wherein the one or more processors register the payment account which is multi-configurable with the payment server through one of a merchant application or an issuer application associated with one or more issuers.

Clause 20: The payment server of any of clauses 17-19, wherein the one or more processors register one or more merchants with the payment server for a third-party credit provider configuration.

Disclosed herein is a computer-implemented method for routing payment transactions of a payment account. The method comprises receiving, by a payment server, a payment request associated with a payment account, wherein the payment request comprises details of the payment account. Thereafter, the method comprises identifying flag information from the payment request indicating the payment account to be multi-configurable. Further, when the payment server identifies that the payment request is from a payment gateway and the payment account is multi-configurable, the method comprises retrieving a list of names of configuration details corresponding to the payment account from a routing service associated with the payment server. Thereafter, the method comprises identifying, by the payment server, if there is a pre-set name of configuration details as a primary configuration for the payment account, then the method comprises providing the list of names to a user associated with the payment account for selecting the pre-set name. Further, the method comprises performing one of retrieving configuration details corresponding to the payment account from the routing service, which is selected as primary configuration details when the payment account is the multi-configurable card or retrieving configuration details corresponding to the selected name from the list of names or the pre-set name from the routing service. Once the configuration details are retrieved, the method comprises routing payment transaction for the payment request to an issuer corresponding to the configuration details for completing the payment transaction.

Further, the present disclosure discloses a payment server comprising one or more processors and one or more computer-readable media, communicatively coupled to the one or more processors storing instructions, which upon execution causes the one or more processors to receive a payment request associated with a payment account, wherein the payment request comprises details of the payment account. The one or more processors identify flag information from the payment request indicating the payment account to be multi-configurable. Thereafter, when the one or more processors identify that the payment request is from a payment gateway and the payment account is multi-configurable, the one or more processors retrieve a list of names of configuration details corresponding to the payment account from a routing service associated with the payment server. Thereafter, the one or more processors identify if there is a pre-set name of configuration details as a primary configuration for the payment account. The one or more processors provide the list of names to a user associated with the payment account and the pre-set name for selection. Thereafter, the one or more processors perform one of retrieving configuration details, corresponding to the payment account from the routing service, which is registered as primary configuration details when the payment account is multi-configurable or retrieving configuration details corresponding to the selected name from the list of names or the pre-set name from the routing service. Thereafter, the one or more processors route a payment transaction for the payment request to an issuer corresponding to the configuration details for completing the payment transaction.

Further, the present disclosure discloses a non-transitory computer-readable media including instructions. The instructions when processed by at least one processor causes the payment server to receive a payment request associated with a payment account, wherein the payment request comprises details of the payment account. The instructions cause the processor to identify flag information from the payment request indicating the payment account to be multi-configurable. Thereafter, the instructions cause the processor to identify that the payment request is from a payment gateway and the payment account is multi-configurable, the one or more processors retrieve a list of names of configuration details corresponding to the payment account from a routing service associated with the payment server. Thereafter, the instructions cause the processor to identify if there is a pre-set name of configuration details as a primary configuration for the payment account. The instructions cause the processor to provide the list of names to a user associated with the payment account and the pre-set name for selection. Thereafter, the instructions cause the processor to perform one of retrieving configuration details, corresponding to the payment account from the routing service, which is registered as primary configuration details when the payment account is multi-configurable or retrieving configuration details corresponding to the selected name from the list of names or the pre-set name from the routing service. Thereafter, the instructions cause the processor to route a payment transaction for the payment request to an issuer corresponding to the configuration details for completing the payment transaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristics of the disclosure are set forth in the appended claims. The disclosure itself, however, as well as a preferred mode of use, further objectives, and advantages thereof, may best be understood by reference to the following detailed description of non-limiting embodiments or aspects when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments or aspects are now described, by way of example only, with reference to the accompanying figures wherein like reference numerals represent like elements and in which:

Figure 1:
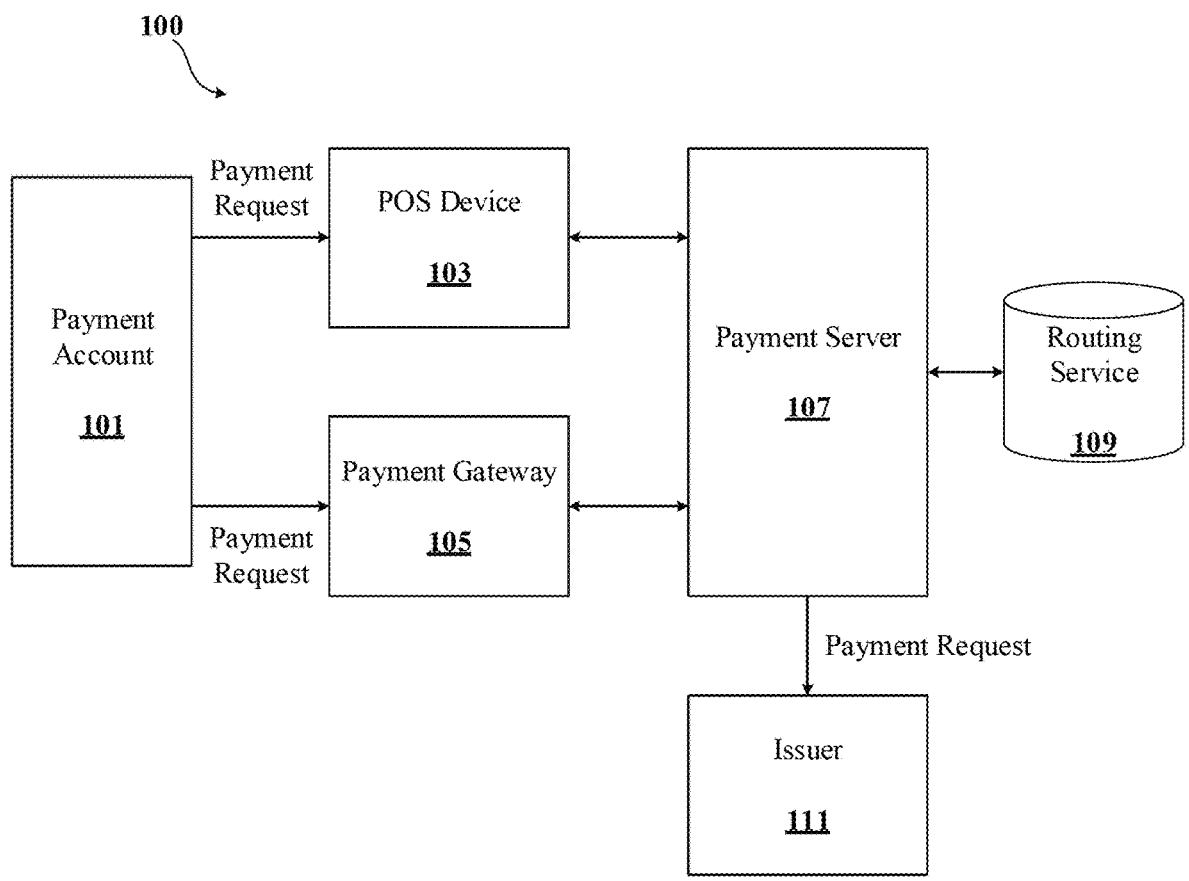
FIG. 1 is an exemplary architecture for routing payment transactions of a payment account in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether such computer or processor is explicitly shown. While each of the figures illustrates a particular non-limiting embodiment or aspect for purposes of illustrating a clear example, other embodiments may omit, add to, reorder, and/or modify any of the elements shown in the figures.

DETAILED DESCRIPTION

In the present document, the term "exemplary" is used herein to mean "serving as an example, instance, or illustration." Any embodiment, aspect, or implementation of the present subject matter described herein as "exemplary" is not necessarily to be construed as preferred or advantageous over other embodiments.

In the following detailed description of non-limiting embodiments or aspects of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion such that a setup, device, or method that comprises a list of components or steps does not include only those components or steps but may include other components or steps not expressly listed or inherent to such setup, device, or method. In other words, one or more elements in a system or apparatus proceeded by "comprises . . . a" do not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/feature. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure relate to a method and a system for routing payment transactions of a payment account. In some non-limiting embodiments or aspects, the payment account may be associated with credit/debit accounts and in multiple form factors such as an IOT device, phone device, credit card, or debit card. The payment transaction for a payment request may be initiated from the payment account. The payment transaction may be initiated at a Point of Sale (POS) device or through a payment gateway. The payment transaction may be initiated from the payment gateway when details of the payment account are provided at a merchant application. When the details of the payment account are provided at the merchant application, the payment request may be initiated and the merchant through the payment gateway may transmit the payment request to the payment server. The payment request may comprise details of the payment account. Upon receiving the payment request, the payment server may identify flag information from the payment request. The flag information indicates that the payment account is multi-configurable, e.g., where the payment account with multiple payment instruments or multiple issuers are configured on to it. In some non-limiting embodiments or aspects, the payment server retrieves a list of names of configuration details corresponding to the payment account from a routing service associated with the payment server and also identifies if there is a pre-set name of configuration detail as a primary configuration for the payment account. The payment server provides the list of names to the user associated with the payment account and the pre-set name for selection.

In some non-limiting embodiments or aspects, when the payment server identifies that the payment request is from the POS, the payment server retrieves configuration details corresponding to the payment account from the routing service which is selected as primary configuration details when the payment account is multi-configurable. Thereafter, the payment server may route the payment transaction for the payment request to an issuer corresponding to the primary configuration details for completing the transaction. In some non-limiting embodiments or aspects, when the payment server identifies that the payment request is from the payment gateway, the payment server retrieves configuration details corresponding to the selected name from the list of names or the pre-set name from the routing service. Each configuration detail is associated with an issuer. The list of names of configuration details is provided to the user for selection. The user may select one of the names, for example, issuer "A". Upon selection, the payment server may retrieve the configuration details corresponding to the selected issuer "A" and route the payment transaction for the payment request to the issuer "A" for completing the payment transaction. In this manner, the present disclosure provides supports multiple issuers and a method for routing transactions of the payment account which is multi-configurable.

FIG. 1 shows an exemplary architecture 100 for routing payment transactions of a multi-issuer card in accordance with some non-limiting embodiments or aspects of the present disclosure. The exemplary architecture 100 comprises a payment account 101, a POS device 103, a payment gateway 105, a payment server 107, an issuer 111, and a routing service 109 associated with the payment server 107. The payment account 101 may be associated with credit/debit accounts and in multiple form factors, such as an IOT device, a phone device, a credit card, a debit card, or the like. The payment account 101 may comprise details, such as account number, card type, validity details, and the like. The payment account 101 may comprise flag information, which indicates that the payment account 101 is multi-configurable, e.g., where the payment account 101 with multiple payment instruments or multiple issuers configured on to it. The configuration details of the first issuer may be stored in a primary slot of the payment account 101. As an example, the configuration details may include, but are not limited to, account type, account identification number, user identification number, user name, type of the payment account 101, and the like.

In some non-limiting embodiments or aspects, the payment server 107 may provide an application to a user of the payment account 101 which is multi-configurable. The user may use the application to enroll multiple issuers with the payment server. As an example, the user may wish to enroll issuer "B" and issuer "C" with the payment server. In this scenario, the payment server 107 may request details from the user and upon validation of the details, the payment server 107 may enroll issuer "B" and issuer "C". Therefore, the payment account 101 now supports issuer "A", issuer "B", and issuer "C". The configuration details of issuer "A" may be stored in the primary slot of the multi-issuer payment account 101 since issuer "A" is the primary issuer of the payment account 101. The configuration details of issuer "B" and issuer "C" may be stored in secondary slots of the payment account 101.

In some non-limiting embodiments or aspects, the payment server 107 may receive the payment request associated with the payment account 101 from a Point of Sale (POS) device. The payment request may comprise details of the payment account 101. Upon receiving the payment request, the payment server 107 may identify the flag information from the payment request that indicates the payment account 101 is multi-configurable. Thereafter, the payment server 107 retrieves a list of names of configuration details corresponding to the payment account 101 from a routing service 109 associated with the payment server 107 and identifies if there is a pre-set of configuration details as a primary configuration for the payment account 101. The payment server 107 may also provide the list of names to the user associated with the payment account 101 and the pre-set name for selection.

As an example, issuer "A" may be registered as a primary issuer of the payment account 101. Therefore, the payment server 107 may retrieve configuration details of the issuer "A" from the routing service 109 that is selected as the primary configuration details when the payment account 101 is multi-configurable. However, at the POS, the user may realize that the merchant associated with the POS 103 device provides rewards under issuer "B". In this scenario, the user may access the application provided by the payment server 107 in a device associated with the user. Using the application, the user may select issuer "B" under a primary slot. Therefore, once the payment request is provided, the payment server 107 retrieves the configuration details corresponding to the payment account 101 from the routing service 109 that is registered as the primary configuration details. In this scenario, issuer "B" is registered as the primary issuer and hence configuration details corresponding to issuer "B" may be retrieved from the routing service 109. Thereafter, the payment server 107 may route the payment transaction for the payment request to issuer "B" for completing the payment transaction.

In some non-limiting embodiments or aspects, the payment server 107 may receive the payment request from the payment gateway 105 when details of the payment account 101 are provided at a merchant application, such as a mobile application, a website, and the like. As an example, the merchant application may be application "X". Upon receiving the payment request, the payment server 107 may identify the flag information from the payment request that indicates that the payment account 101 is multi-configurable. Therefore, the payment server 107 may retrieve the list of names of configuration details corresponding to the payment account 101 from the routing service 109. As an example, the list of names of configuration details may be issuer "A", issuer "B", issuer "C", and issuer "D". Upon retrieval, the payment server 107 may provide the names to the user at the application "X" for selection. The user may select issuer "D". Upon selection by the user, the payment server 107 may retrieve configuration details corresponding to the selected name corresponding to issuer "D". Therefore, the payment server 107 may route the payment transaction for the payment request to issuer "D" for completing the payment transaction. The merchant application may store the configuration details corresponding to the selected name as the primary configuration details at the merchant application for future transactions.

Figure 2:
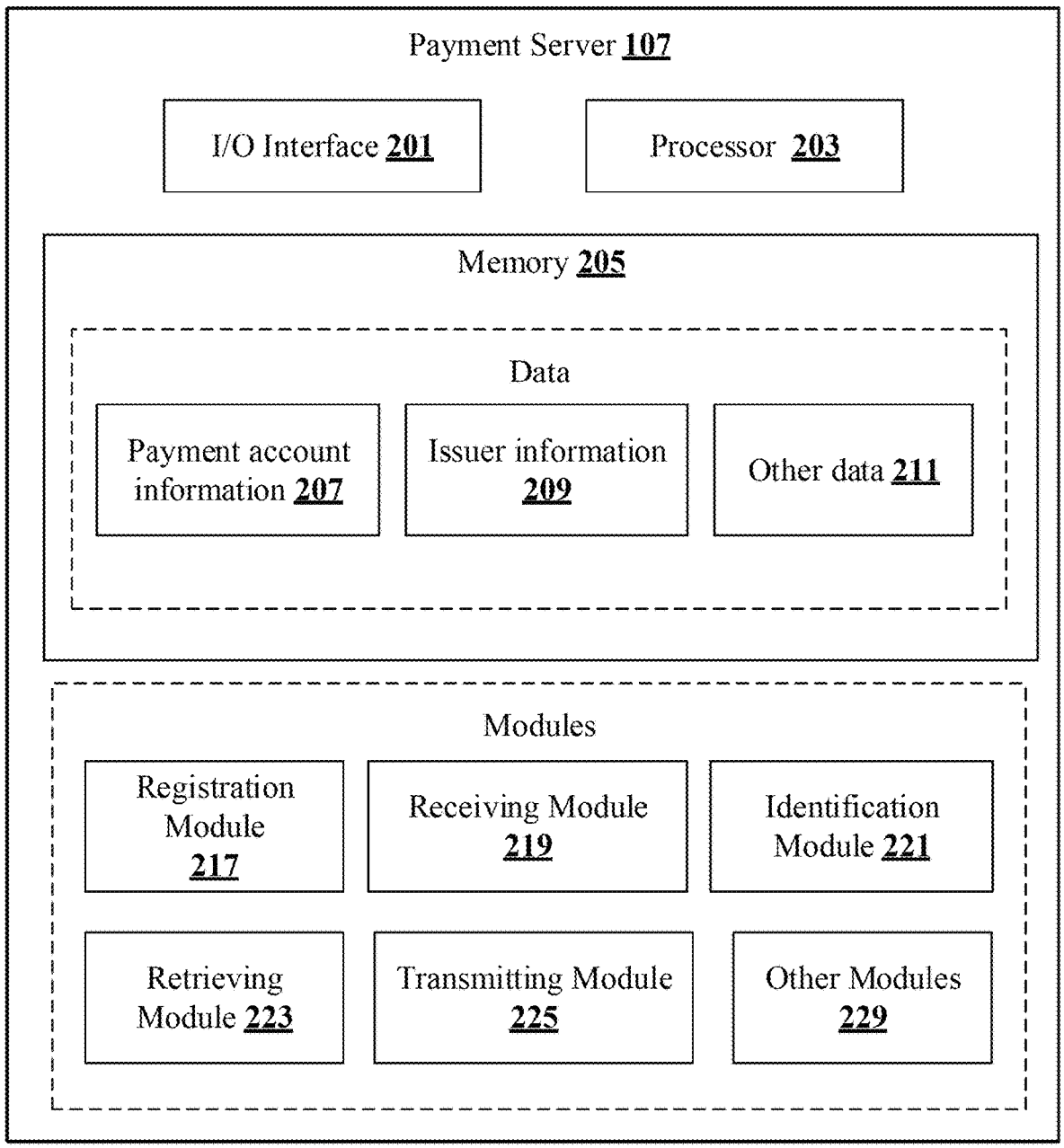
FIG. 2 is a block diagram of a payment server in accordance with some non-limiting embodiments or aspects of the present disclosure.

FIG. 2 shows a block diagram of a payment server 107 in accordance with some non-limiting embodiments or aspects of the present disclosure. In some implementations, the payment server 107 may include data and modules. As an example, the data is stored in a memory 205 of the payment server 107 as shown in FIG. 2. In some non-limiting embodiments or aspects, the data may include payment account information 207, issuer information 209, and other data 211. As illustrated in FIG. 2, modules are described herein in detail.

In some non-limiting embodiments or aspects, the data may be stored in the memory 205 in the form of various data structures. Additionally, the data can be organized using data models, such as relational or hierarchical data models. The other data 211 may store data, including temporary data and temporary files, generated by the modules for performing the various functions of the payment server.

In some non-limiting embodiments or aspects, the data stored in the memory 205 may be processed by the modules of the payment server 107. The modules may be stored within the memory 205. In an example, the modules communicatively coupled to a processor 203 configured in the payment server 107 may also be present outside the memory 205, as shown in FIG. 2, and implemented as hardware. The processor 203 may be configured to perform the functionalities of the payment server. The processor 203 may receive a payment request through an I/O interface 201. The I/O interface 201 may also be used for routing a payment transaction to an issuer 111. As used herein, the term modules may refer to an Application Specific Integrated Circuit (ASIC), an electronic circuit, a processor 203 (shared, dedicated, or group), and memory 205 that execute one or more software or firmware programs, a combinational logic circuit, and/or other suitable components that provide the described functionality.

In some non-limiting embodiments or aspects, the modules may include, for example, a registration module 217, a receiving module 219, an identification module 221, a retrieving module 223, a transmitting module 225, and other modules 229. The other modules 229 may be used to perform various miscellaneous functionalities of the payment sever 107. It will be appreciated that such aforementioned modules may be represented as a single module or a combination of different modules. Furthermore, a person of ordinary skill in the art will appreciate that in an implementation, the one or more modules may be stored in the memory 205, without limiting the scope of the disclosure. The modules, when configured with the functionality defined in the present disclosure, will result in a novel hardware.

In some non-limiting embodiments or aspects, the registration module 217 may be configured to register or enroll one or more issuers with the payment server. In some non-limiting embodiments or aspects, the payment server 107 may provide an application for issuer enrollment with the payment server. Using the application, the user may enroll the issuers with the payment server. As an example, the payment account 101 may be issued to the user by issuer "A". Therefore, issuer "A" may be the primary issuer and configuration details of the primary issuer, and issuer "A" may be stored in a primary slot of the payment account 101. Using the application, the user may add issuer "B" and issuer "C" with the payment server. The payment server 107 may request the user to provide documents for verification. The user may upload the documents for verification through the application. Upon verification, the payment server 107 may register details of issuer "B" and issuer "C" with the payment server. The configuration details of issuer "B" and issuer "C" may be stored in secondary slots of the payment account 101.

In some non-limiting embodiments or aspects, the receiving module 219 may be configured to receive a payment request associated with the payment account 101. The payment request may be received from the POS device 103 or from the payment gateway 105. The payment request may be received from the payment gateway 105 when details of the payment account 101 are provided at a merchant application. The payment request may be received from the POS device 103 when the user makes a payment transaction at the POS device 103 in a merchant location.

In some non-limiting embodiments or aspects, the identification module 221 may be configured to identify whether the payment account 101 is a multi-configurable or not. The payment server 107 may receive a payment request associated with the payment account 101. The payment request may comprise details of the account along with flag information. The details of the payment account 101 may include, but are not limited to, card number, card type, user identification number, username, and the like. If the flag information is present, the payment server 107 may identify the payment account 101 as multi-configurable. The absence of the flag information indicates that the payment account 101 is not multi-configurable. In some non-limiting embodiments or aspects, status of a flag can be used to identify if the payment account 101 is multi-configurable or not.

In some non-limiting embodiments or aspects, the retrieving module 223 may be configured to retrieve the list of names of configuration details corresponding to the payment account 101 from the routing service 109 associated with the payment server. In some non-limiting embodiments or aspects, when the payment request is from the payment gateway 105 and when the payment server 107 identifies that the payment account 101 is a multi-configurable, the retrieving module 223 retrieves a list of names of configuration details associated with the payment account 101 from the routing service 109. As an example, there may be three issuers associated with the payment account 101, issuer "A", issuer "B", and issuer "C". Therefore, the list of names of the issuers, issuer "A", issuer "B" and issuer "C", may be retrieved from the routing service 109 and may be provided to the user at the merchant application for selection by the user. The user may select one of the list of names of the configuration details. As an example, the user may select issuer "B". Therefore, the transmitting module 225 may transmit or route the payment transaction to issuer "B" for completing the transaction.

In some non-limiting embodiments or aspects, the retrieving module 223 may be configured to retrieve configuration details, corresponding to the payment account 101 from the routing service 109. In some non-limiting embodiments or aspects, when the payment server 107 receives a payment request from the POS device 103, the retrieving module 223 may retrieve configuration details corresponding to the payment account 101 from the routing service 109, which is selected as primary configuration details when the payment account 101 is multi-configurable. As an example, the configuration details selected by the user may be related to issuer "A". Therefore, the retrieving module 223 retrieves configuration details of issuer "A", and the transmitting module 225 may transmit or route the payment transaction for the payment request to issuer "A" for completing the transaction.

Figure 3:
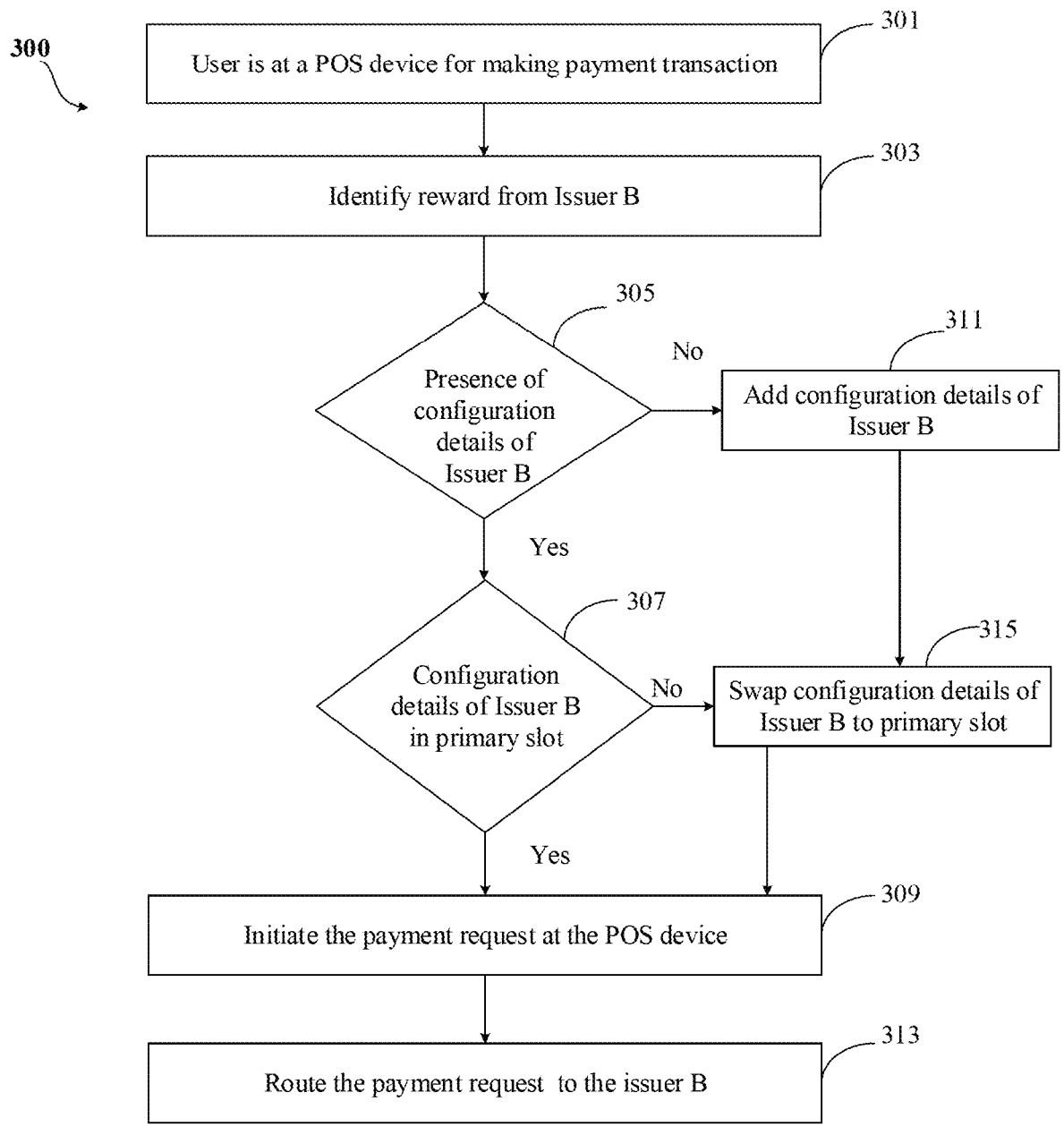
FIG. 3 is a flow chart illustrating a method for routing a payment transaction when the payment request is from a Point of Sale (POS) device in accordance with some non-limiting embodiments or aspects of the present disclosure.

FIG. 3 shows a flow chart 300 illustrating a method for routing payment transaction when the payment request is from a POS device 103 in accordance with some non-limiting embodiments or aspects of the present disclosure.

At block 301, the user is at a POS device 103 for making a payment transaction. At block 303, the user may realize that issuer "B" provides a reward if the payment transaction is performed at the merchant. At block 305, the presence of configuration details of issuer "B" for the payment account 101 using an application is determined. If the configuration details of issuer "B" is present for the payment account 101, then the method may proceed to block 307, otherwise, the method may proceed to block 311. At block 307, the user may determine if the configuration details of issuer "B" are in the primary slot. If the configuration details of issuer "B" is in the primary slot then the method may proceed to block 309, else the method may proceed to block 315. At block 315, the user may swap the configuration details of issuer "B" to the primary slot. At block 309, once the configuration details of issuer "B" is in the primary slot, the user may initiate the payment request at the POS device 103, and the POS device 103 provides the payment request to the payment server 107. The payment server 107 retrieves configuration details corresponding to issuer "B" and routes the payment transaction to issuer "B" for completing the payment transaction at block 313. At block 311, the user may add configuration details of issuer "B" in the application. Once the configuration details are added and the configuration details of issuer "B" are in the primary slot, the user may initiate the payment transaction for the payment request and route the payment request to issuer "B" for completing the payment transaction.

Figure 4:
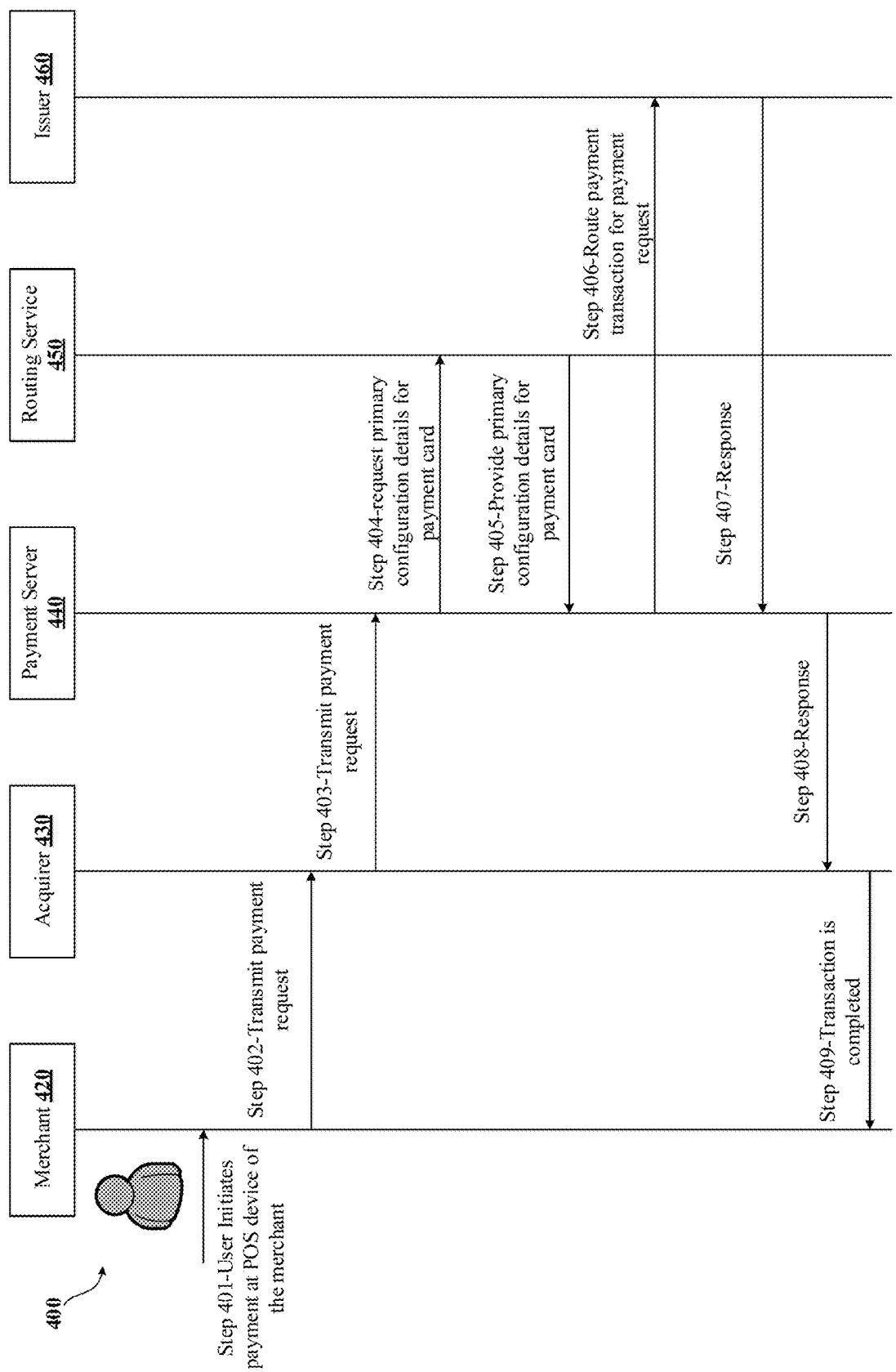
FIG. 4 is a sequence diagram illustrating a sequence of actions in routing a payment transaction when a payment request is from a POS device in accordance with some non-limiting embodiments or aspects of the present disclosure.

FIG. 4 shows a sequence diagram 400 illustrating a sequence of actions in routing a payment transaction when a payment request is from the POS device 103 in accordance with some non-limiting embodiments or aspects of the present disclosure.

As an example, a customer is at a merchant location and uses the POS device 103 for conducting a payment transaction. At step 401, the payment account 101 is used at the POS device 103 of a merchant 420 for making the payment transaction. At step 402, the merchant 420 transmits the payment request to an acquirer 430 of the merchant 420. The payment request comprises details of the payment account 101. The details of the payment account 101 may include, but are not limited to, card type, card number, issuer of the card, and the like. At step 403, the acquirer 430 transmits the payment request to a payment server 440. The payment server 440 identifies flag information from the payment request indicating the payment account 101 to be multi-configurable. Therefore, the payment server 440 retrieves a list of names of configuration details corresponding to the payment account 101 from a routing service 450 associated with the payment server. The payment server 440 may also identify if there is a pre-set name of configuration details as a primary configuration for the payment account 101. The payment server 440 provides the list of names to the user associated with the payment account 101 and the pre-set name for selection. The payment server 440 retrieves configuration details corresponding to the payment account 101 from the routing service 450, which is selected as primary configuration details when the payment account 101 is multi-configurable.

At step 404, the payment server 440 requests primary configuration details for the payment account 101 from the routing service 450. At step 405, the routing service 450 provides primary configuration details registered for the payment account 101. As an example, the primary configuration details registered for the payment account 101 may be configuration details of the primary issuer. As an example, the primary issuer may be issuer "A". Therefore, the payment server 440 at step 406, may route the payment transaction for the payment request to issuer "A" for completing the payment transaction. However, if the acquirer 430 and the issuer are the same, the payment server 440 may route the transaction to the acquirer 430 for completing the transaction. Issuer "A" may either approve or reject the payment transaction based on validation of the payment transaction. At step 407, the issuer 460 may transmit the response regarding approval or rejection of the payment transaction to the payment server. At step 408, the payment server 440 may transmit the response to the acquirer 430 and at step 409, the acquirer 430 may transmit the response to the merchant 420 for completing the payment transaction.

Figure 5:
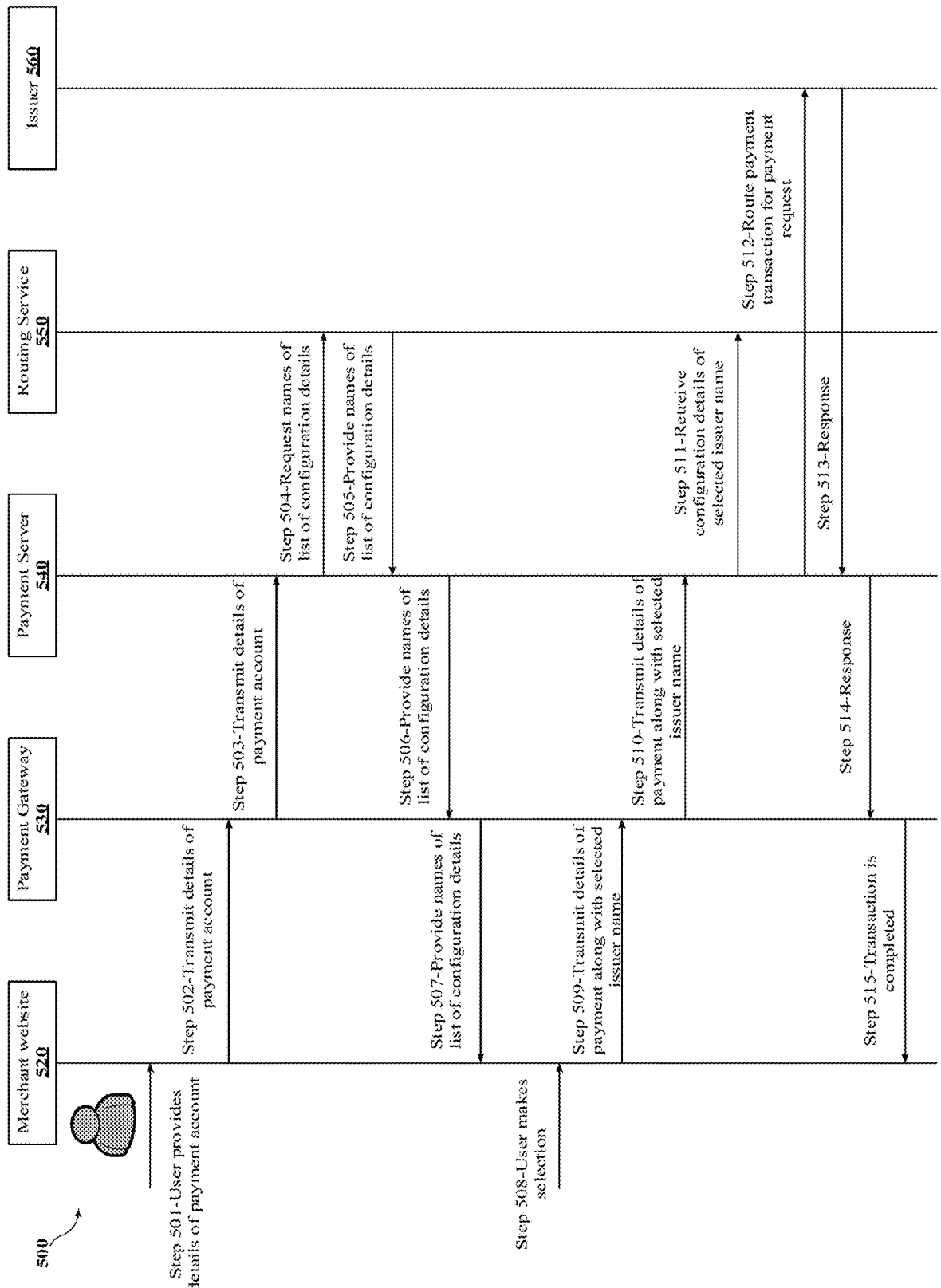
FIG. 5 is a sequence diagram illustrating a sequence of actions in routing a payment transaction when a payment request is from a payment gateway in accordance with some non-limiting embodiments or aspects of the present disclosure.

FIG. 5 shows a sequence diagram 500 illustrating a sequence of actions in routing payment transaction when the payment request is from a payment gateway in accordance with some non-limiting embodiments or aspects of the present disclosure.

As an example, the customer may be using an application website "X" and at the application website "X" the customer may intend to make the payment transaction, and, hence, provide details of the payment account 101 at step 501. At step 502, a merchant website 520 may transmit the details of the payment account 101 to a payment gateway 530. At step 503, the payment gateway 530 associated with the merchant website 520 may transmit the details of the payment account 101 to a payment server 540. The payment server 540 may identify the flag information from the details of the payment account 101 indicating that the payment account 101 is multi-configurable. At step 504, the payment server 540 may request the list of names of configuration details of the payment account 101 from a routing service 550 and at step 505, the routing service 550 may provide the list of names of configuration details to the payment server 540. As an example, the list of names of the configuration details may be issuer "A", issuer "B", and issuer "C". At step 506, the payment server 540 may transmit the list of names of the configuration details to the payment gateway 530 and at step 507, the payment gateway 530 may transmit the names to the merchant website 520. At the merchant website 520 at step 508, the user may select issuer "B". The selected name of the issuer may be stored as the primary issuer for future transactions by the payment server 540. At step 509, the merchant website 520 may transmit the selected issuer name along with the details of the payment request to the payment gateway 530. At step 510, the payment gateway 530 may transmit these details to the payment server 540. At step 511, the payment server 540 may retrieve configuration details of issuer "B". At step 512, the payment server 540 may route the payment transaction to issuer "B". At step 513, issuer "B" may transmit the response regarding approval or rejection of the payment transaction to the payment server 540. At step 514, the payment server 540 may transmit the response to the payment gateway 530 and at step 515, the payment gateway 530 may transmit the response to the merchant website 520 for completing the payment transaction.

Figure 6:
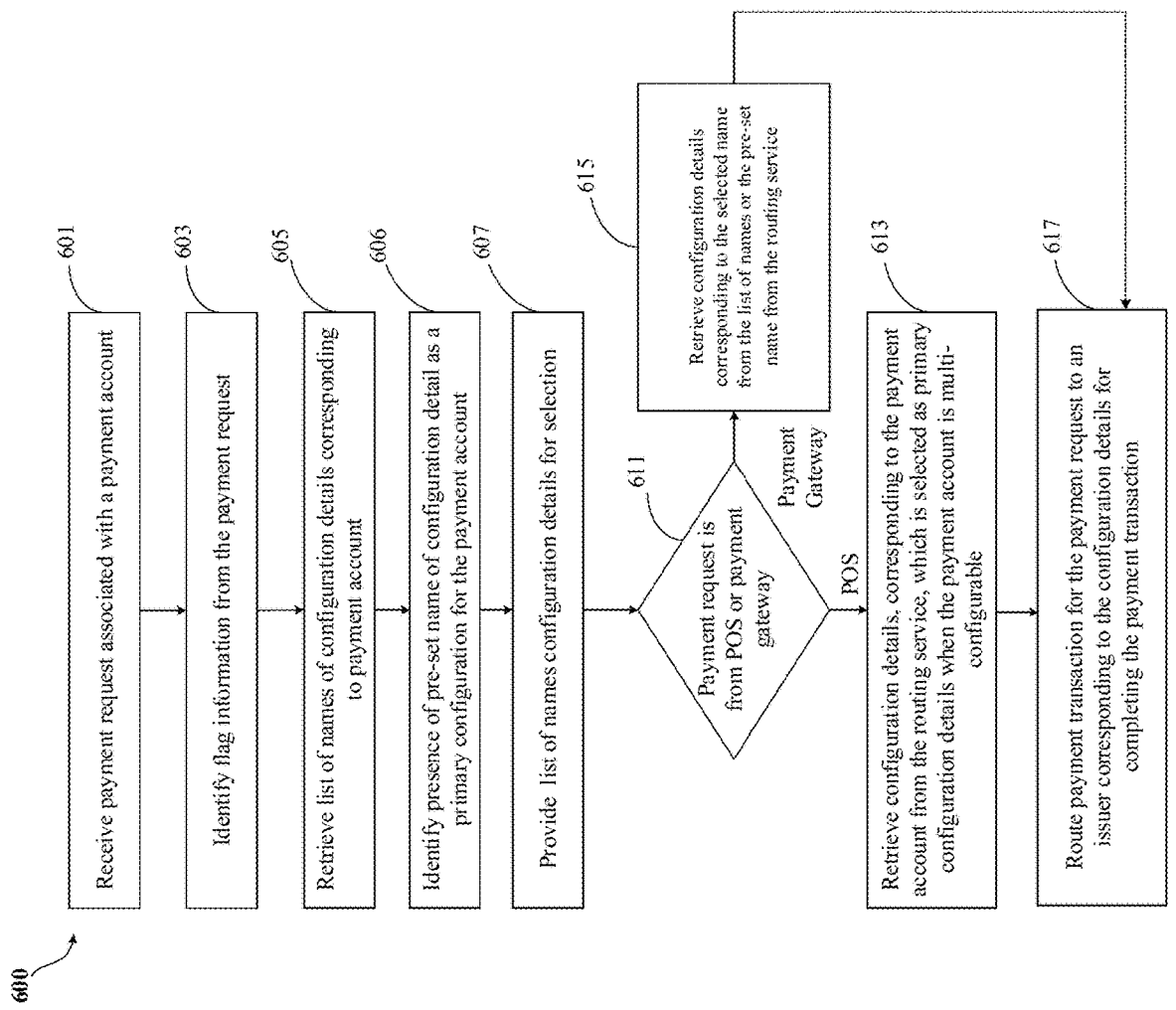
FIG. 6 is a flowchart illustrating a method for routing payment transactions in accordance with some non-limiting embodiments or aspects of the present disclosure.

FIG. 6 shows a flowchart 600 illustrating a method for routing payment transactions of a payment account 101 in accordance with some non-limiting embodiments or aspects of the present disclosure. As illustrated in FIG. 6, the method includes one or more blocks illustrating a method for routing payment transactions. The method may be described in the general context of computer-executable instructions. Generally, computer-executable instructions can include routines, programs, objects, components, data structures, procedures, modules, and functions, which perform specific functions or implement specific abstract data types.

The order in which the method is described is not intended to be construed as a limitation, and any number of the described method blocks can be combined in any order to implement the method. Additionally, individual blocks may be deleted from the method without departing from the spirit and scope of the subject matter described herein. Furthermore, the method can be implemented in any suitable hardware, software, firmware, or combination thereof.

At block 601, the method may include receiving a payment request associated with a payment account 101. The payment request may comprise details of the payment account 101. The payment request may be received from either a payment gateway 105 or from a POS device 103. The payment request may be received from the POS device 103 when the user is at a merchant location. The payment request may be received from the payment gateway 105 when details of the payment account 101 are provided at a merchant application, wherein the merchant application is associated with the payment gateway 105. At block 603, the method may include identifying flag information from the payment request. The payment server 107 may identify flag information from the payment request. The flag information indicates the payment account 101 to be multi-configurable.

At block 605, the method may include retrieving a list of names of configuration details corresponding to the payment account 101 from a routing service 109 associated with the payment server. The payment server 107 may retrieve the list of names of configuration details, such as issuer "A", issuer B, issuer "C", and so on who are the registered issuers with the payment server 107 corresponding to the payment account 101. Thereafter, at block 606, the method may include if there are any pre-set names of configuration details as a primary configuration detail for the payment account 101. If there is a pre-set name, then the pre-set name would be selected. Otherwise, the method may proceed to block 607.

At block 607, the method may include providing the list of names to a user associated with the payment account 101 for selecting a name. At block 611, the method may include determining whether the payment request is from a payment gateway 105 or from a POS device 103. The payment request may be received from the payment gateway 105 when the user provides details of the payment account 101 at a merchant application. The payment request may be received from the POS device 103 when the user uses the payment account 101 at the POS device 103. If the payment request is received from the payment gateway 105, the method may proceed to block 615. If the payment request is received from the POS device 103, the method may proceed to block 613. Upon selection, the payment server 107 at block 613 may retrieve configuration details corresponding to the payment account 101 which is selected as the primary configuration details. At block 615, the method may include retrieving configuration details corresponding to the selected name from the list of names or the pre-set name from the routing service 109. At block 617, the method may include routing the payment transaction for the payment request to an issuer 111 corresponding to the configuration details for completing the payment transaction.

Figure 7:
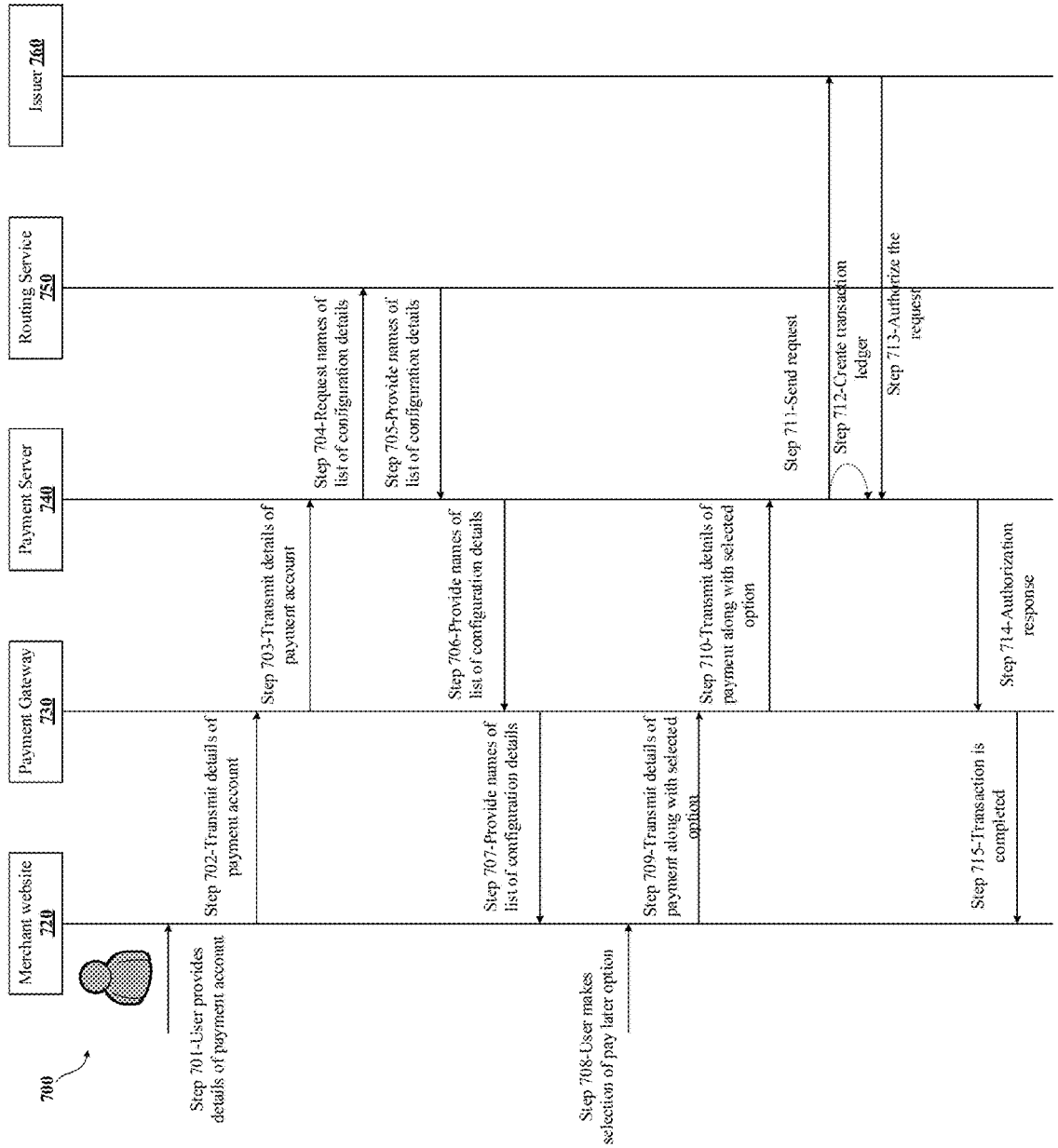
FIG. 7 is a sequence diagram illustrating sequence of actions in a routing payment transaction in a pay-later scenario.

FIG. 7 shows a sequence diagram 700 illustrating sequence of actions in routing payment transaction in a pay-later scenario in accordance with some non-limiting embodiments or aspects of the present disclosure.

As an example, the customer may be using an application website "X" and, at the application website "X", the customer may intend to make the payment transaction, and, hence, provide details of the payment account 101 at step 701. The payment account 101 of the customer may be registered with a payment server 740 for third-party credit provider configurations. Further, the payment account that is multi-configurable may be registered with the payment server 740 through one of a merchant application or an issuer application associated with one or more issuers. The one or more merchants that wish to provide a pay-later configuration may register with the payment server 740 for third-party credit provider configuration. At step 702, a merchant website 720 may transmit the details of the payment account 101 to a payment gateway 730. At step 703, the payment gateway 730 associated with the merchant website "X" may transmit the details of the payment account 101 to the payment server 740.

At step 704, the payment server 740 may identify the flag information from the details of the payment account 101 indicating that the payment account 101 is multi-configurable, and may request the list of names of configuration details of the payment account 101 from a routing service 750. At step 705, the routing service 750 may provide the list of names of configuration details to the payment server. As an example, the list of names of configuration details may be issuer "A", issuer "B", issuer "C", and a pay-later option. At step 706, the payment server 740 may provide the list of names of configuration details to the payment gateway 730, and at step 707, the payment gateway 730 may provide the names to the merchant website 720. At the merchant website 720 at step 708, the user may select the pay-later option. The pay-later option may be associated with the first merchant application. In this scenario, the first merchant application may be the merchant website 720. The payment server 740 may identify the first merchant application which is website 720 in this scenario as a credit provider for the payment transaction.

Therefore, at step 709, the merchant website 720 may transmit the selected option to the payment gateway 730 and at step 710, the selection option may be transmitted to the payment server 740. At step 711, the payment server 740 may send a request to an issuer 760 associated with the first merchant application to complete a payment transaction for the payment request using a credit amount provided by the first merchant application when the first merchant application is identified as a third-party a credit provider for the payment request. Further, at step 712, the payment server 740 may create a transaction ledger for every payment transaction of the user with the first merchant application and to deduct the credit amount from the issuer 760 associated with the payment account 101. At step 713, the issuer 760 may authorize the request and send the authorization response to the payment server 740. At step 714, the payment server 740 may send the authorization response to the payment gateway 730 and at step 715, the transaction complete response may be sent to the merchant website 720 from the payment gateway 730.

In another scenario, the customer may be using an application website "Y", and at the application website "Y" the customer may intend to make the payment transaction, and, hence, provide details of the payment account 101. The payment account 101 of the customer may be registered with the payment server 740 for third-party credit provider configurations. The one or more merchants that wish to provide pay-later configuration may register with the payment server 740 for third-party credit provider configuration. The merchant website "Y" may transmit the details of the payment account 101 to the payment gateway 730. The payment gateway 730 associated with the merchant website may transmit the details of the payment account 101 to the payment server 740. The payment server 740 may identify the flag information from the details of the payment account 101 indicating that the payment account 101 is multi-configurable. The payment server 740 may request the list of names of configuration details of the payment account 101 from the routing service 750 and the routing service 750 may provide the list of names of configuration details to the payment server 740. As an example, the list of names of configuration details may be issuer "A", issuer "B", issuer "C", and a pay-later option.

The payment server 740 may transmit the list of names of configuration details to the payment gateway 730, and the payment gateway 730 may transmit the names to the merchant website. At the merchant website, the user may select the pay-later option. The pay-later option may be associated with the second merchant application. Therefore, the payment server, may send a request to the issuer 760 associated with the second merchant application to complete the payment transaction for the payment request using a credit amount provided by the second merchant application when the second merchant application is identified as a third-party credit provider for the payment request. Further, the payment server 740 may create a transaction ledger for every payment transaction of the user with the second merchant application and to deduct the credit amount from the issuer 760 associated with the payment account 101. The issuer 760 may authorize the request and send the authorization response to the payment server. The payment server 740 may send the authorization response to the payment gateway 730, and the transaction complete response may be sent to the merchant website from the payment gateway 730.

In some non-limiting embodiments or aspects, the present disclosure provides a method and a system for routing payment transactions of a payment account which is multi-configurable. In some non-limiting embodiments or aspects, the present disclosure provides a payment account which is multi-configurable and hence can be used in place of plurality of payment cards and hence hassle free for users/customers. In some non-limiting embodiments or aspects, the present disclosure allows users to use the multi-configurable payment account for selecting any of the registered issuers with payment server 107 for making payment transaction.

Figure 8:
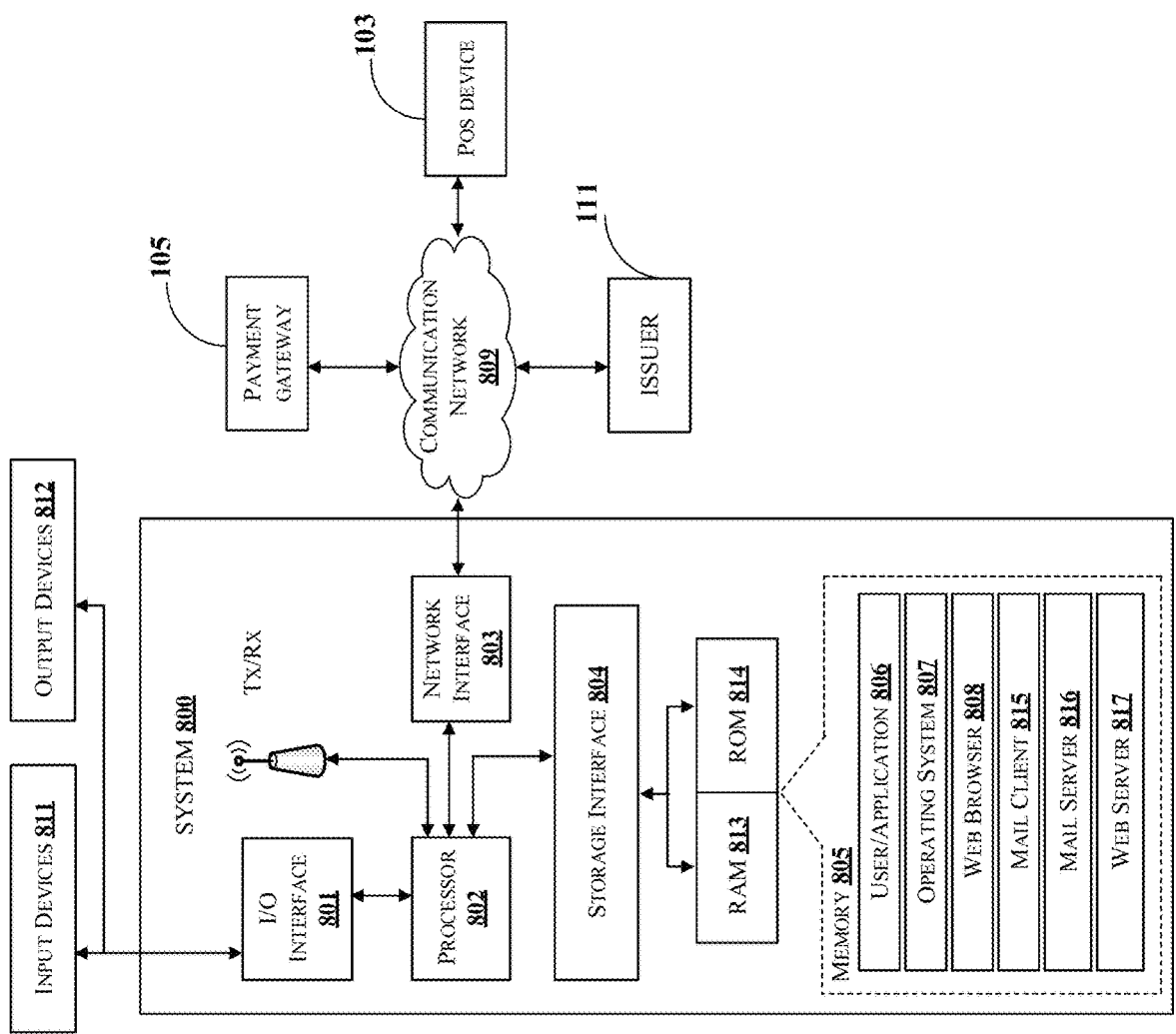
FIG. 8 is a block diagram of an exemplary computer system for implementing embodiments consistent with the present disclosure.

FIG. 8 illustrates a block diagram of an exemplary computer system 800 for implementing embodiments consistent with the present disclosure. In some non-limiting embodiments or aspects, the computer system 800 may be a payment server 107 for routing payment transactions of a payment account. The computer system 800 may include a central processing unit ("CPU" or "processor") 802. The processor 802 may comprise at least one data processor for executing program components for executing user- or system-generated business processes. The processor 802 may include specialized processing units such as integrated system (bus) controllers, memory management control units, floating point units, graphics processing units, digital signal processing units, etc.

The processor 802 may be disposed in communication with one or more input/output (I/O) devices (811 and 812) via an I/O interface 801. The I/O interface 801 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth®, cellular (e.g., Code-Division Multiple Access (CDMA), High-Speed Packet Access (HSPA+), Global System For Mobile Communications (GSM), Long-Term Evolution (LTE) or the like), etc. Using the I/O interface 801, the computer system 800 may communicate with one or more I/O devices 811 and 812. In some implementations, the I/O interface 801 may be used to connect to the issuer 111 or acquirer or the payment gateway 105 or the POS device 103.

In some non-limiting embodiments or aspects, the processor 802 may be disposed in communication with a communication network 809 via a network interface 803. The network interface 803 may communicate with the communication network 809. The network interface 803 may employ connection protocols including, without limitation, direct connect, Ethernet (e.g., twisted pair 10/100/ 1000 Base T), Transmission Control Protocol/Internet Protocol (TCP/IP), token ring, IEEE 802.11a/b/g/n/x, etc.

The communication network 809 can be implemented as one of the several types of networks, such as intranet or Local Area Network (LAN) and such within the organization. The communication network 809 may either be a dedicated network or a shared network, which represents an association of several types of networks that use a variety of protocols, for e.g., Hypertext Transfer Protocol (HTTP), Transmission Control Protocol/Internet Protocol (TCP/IP), Wireless Application Protocol (WAP), etc., to communicate with each other. Further, the communication network 809 may include a variety of network devices, including routers, bridges, servers, computing devices, storage devices, etc.

In some non-limiting embodiments or aspects, the processor 802 may be disposed in communication with a memory 805 (e.g., Random Access Memory (RAM) 813, Read Only Memory (ROM) 814, etc. as shown in FIG. 8) via a storage interface 804. The storage interface 804 may connect to memory 805 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, a user/application 806, an operating system 807, a web browser 808, a mail client 815, a mail server 816, a web server 817, and the like. In some non-limiting embodiments or aspects, computer system 800 may store the user/application data 806, such as the data, variables, records, etc. as described in this disclosure. Such databases may be implemented as fault-tolerant, relational, scalable, secure databases such as Oracle® or Sybase®.

The operating system 807 may facilitate resource management and operation of the computer system 800. Examples of operating systems include, without limitation, APPLE MACINTOSH® OS X, UNIX®, UNIX-like system distributions (E. G., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT WINDOWS® (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For e.g., user interfaces may provide computer interaction interface elements on a display system operatively connected to the computer system 800, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT WINDOWS® (XP™ VISTA™/7/8, 10 etc.), Unix® X-Windows, web interface libraries (e.g., AJAX™ DHTML™, ADOBE® FLASH™, JAVASCRIPT™, JAVA™, etc.), or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer-readable medium", where a processor may read and execute the code from the computer-readable medium. The processor is at least one of a microprocessor and a processor capable of processing and executing the queries. A non-transitory computer-readable medium may include media, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, and the like), and the like. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), and the like).

An "article of manufacture" includes non-transitory computer-readable medium and/or hardware logic in which code may be implemented. A device in which the code implementing the described embodiments of operations are encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "some non-limiting embodiments or aspects", "embodiment", "embodiments", "the embodiment", "the embodiments", "one or more embodiments", "some-non-limiting embodiments or aspects", and "some non-limiting embodiments or aspects" mean "one or more (but not all) embodiments of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations discussed and disclosed herein show certain events occurring in a certain order. In alternative embodiments or aspects, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

A description of some non-limiting embodiments or aspects with several components in communication with each other does not imply that all such components are required. On the contrary, a variety of optional components is described to illustrate the wide variety of possible embodiments of the disclosure.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
    registering, by a payment server, a payment account which is multi-configurable with the payment server for a third-party credit provider configuration;
    receiving, by the payment server, a payment request associated with the payment account from a payment gateway when details of the payment account are provided at a first merchant application;
    providing, by the payment server, a list of names of configuration details corresponding to the payment account to a user associated with the payment account along with a pay-later option associated with the first merchant application;
    retrieving, by the payment server, configuration details corresponding to a selected pay-later option from a routing service of the payment server;
    identifying, by the payment server, the first merchant application as a credit provider for a payment transaction; and
    sending, by the payment server, a request to the first merchant application to complete a payment transaction for the payment request using a credit amount provided by the first merchant application when the first merchant application is identified as a third-party credit provider for the payment request:
        to create a transaction ledger for every payment transaction of the user with the first merchant application; and
        to deduct the credit amount from an issuer associated with the payment account.

2. The computer-implemented method of claim 1, further comprising:
    sending, by the payment server, a request to a second merchant application to complete a payment transaction for the payment request using a credit amount provided by the second merchant application when the second merchant application is identified as a third-party credit provider for the payment request:
        to create a transaction ledger for every payment transaction of the user with the second merchant application; and
        to deduct the credit amount from the issuer associated with the payment account.

3. The computer-implemented method of claim 1, wherein the payment account which is multi-configurable is registered with the payment server through one of a merchant application or an issuer application associated with one or more issuers.

4. The computer-implemented method of claim 1, wherein one or more merchants are registered with the payment server for a third-party credit provider configuration.

5. The computer-implemented method of claim 1, wherein the payment account which is multi-configurable comprises a payment account that is associated with a plurality of sets of configuration details from a plurality of issuers configured on the payment account, such that the plurality of sets of configuration details for the payment account are stored with a routing service in association with the plurality of issuers, each set of configuration details of the plurality of sets of configuration details being identified by a name that is also stored with the routing service.

6. The computer-implemented method of claim 1, further comprising:
    receiving a request to register for a third-party credit provider configuration from a merchant associated with the first merchant application.

7. The computer-implemented method of claim 1, further comprising:
    receiving a selection of the selected pay-later option via a website of a merchant associated with the first merchant application.

8. A payment server comprising:
    at least one processor programmed or configured to:
        register a payment account which is multi-configurable with the payment server for third-party credit provider configuration;
        receive a payment request associated with the payment account from a payment gateway when details of the payment account are provided at a first merchant application;
        provide a list of names of configuration details corresponding to the payment account to a user associated with the payment account along with a pay-later option associated with the first merchant application;
        retrieve configuration details corresponding to a selected pay-later option from a routing service of the payment server;
        identify the first merchant application as a credit provider for a payment transaction; and
        send a request to the first merchant application to complete the payment transaction for the payment request using a credit amount provided by the first merchant application when the first merchant application is identified as a third-party credit provider for the payment request:
  to create a transaction ledger for every payment transaction of the user with the first merchant application; and
  to deduct the credit amount from an issuer associated with the payment account.

9. The payment server of claim 8, wherein the at least one processor is further programmed or configured to:
  send a request to a second merchant application to complete a payment transaction for the payment request using a credit amount provided by the second merchant application when the second merchant application is identified as a third-party credit provider for the payment request:
    to create a transaction ledger for every payment transaction of the user with the second merchant application; and
    to deduct the credit amount from an issuer associated with the payment account.

10. The payment server of claim 8, wherein the at least one processor is further programmed or configured to:
  register the payment account which is multi-configurable with the payment server through one of a merchant application or an issuer application associated with one or more issuers.

11. The payment server of claim 8, wherein the at least one processor is further programmed or configured to:
  register one or more merchants with the payment server for a third-party credit provider configuration.

12. The payment server of claim 8, wherein the payment account which is multi-configurable comprises a payment account that is associated with a plurality of sets of configuration details from a plurality of issuers configured on the payment account, such that the plurality of sets of configuration details for the payment account are stored with a routing service in association with the plurality of issuers, each set of configuration details of the plurality of sets of configuration details being identified by a name that is also stored with the routing service.

13. The payment server of claim 8, wherein the at least one processor is further programmed or configured to:
  receive a request to register for a third-party credit provider configuration from a merchant associated with the first merchant application.

14. The payment server of claim 8, wherein the at least one processor is further programmed or configured to:
  receive a selection of the selected pay-later option via a website of a merchant associated with the first merchant application.

15. A computer program product comprising a non-transitory computer-readable medium comprising one or more instructions that, when executed by at least one processor, cause the at least one processor to:
  register a payment account which is multi-configurable with a payment server for third-party credit provider configuration;
  receive a payment request associated with the payment account from a payment gateway when details of the payment account are provided at a first merchant application;
  provide a list of names of configuration details corresponding to the payment account to a user associated with the payment account along with a pay-later option associated with the first merchant application;
  retrieve configuration details corresponding to a selected pay-later option from a routing service of the payment server;
  identify the first merchant application as a credit provider for a payment transaction; and
  send a request to the first merchant application to complete the payment transaction for the payment request using a credit amount provided by the first merchant application when the first merchant application is identified as a third-party credit provider for the payment request:
    to create a transaction ledger for every payment transaction of the user with the first merchant application; and
    to deduct the credit amount from an issuer associated with the payment account.

16. The computer program product of claim 15, wherein the one or more instructions further cause the at least one processor to:
  send a request to a second merchant application to complete a payment transaction for the payment request using a credit amount provided by the second merchant application when the second merchant application is identified as a third-party credit provider for the payment request:
    to create a transaction ledger for every payment transaction of the user with the second merchant application; and
    to deduct the credit amount from an issuer associated with the payment account.

17. The computer program product of claim 15, wherein the one or more instructions further cause the at least one processor to:
  register the payment account which is multi-configurable with the payment server through one of a merchant application or an issuer application associated with one or more issuers.

18. The computer program product of claim 15, wherein the one or more instructions further cause the at least one processor to:
  register one or more merchants with the payment server for a third-party credit provider configuration.

19. The computer program product of claim 15, wherein the one or more instructions further cause the at least one processor to:
  receive a request to register for a third-party credit provider configuration from a merchant associated with the first merchant application.

20. The computer program product of claim 15, wherein the one or more instructions further cause the at least one processor to:
  receive a selection of the selected pay-later option via a website of a merchant associated with the first merchant application.

* * * * *